(12) United States Patent
Mozisek

(10) Patent No.: US 10,100,597 B2
(45) Date of Patent: Oct. 16, 2018

(54) SYSTEMS AND METHODS FOR ASSEMBLING A BLOWOUT PREVENTER

(71) Applicant: CAMERON INTERNATIONAL CORPORATION, Houston, TX (US)

(72) Inventor: Taylor Mozisek, Katy, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 15/243,539

(22) Filed: Aug. 22, 2016

(65) Prior Publication Data

US 2018/0051530 A1    Feb. 22, 2018

(51) Int. Cl.
  *E21B 33/06* (2006.01)
  *F16B 9/02* (2006.01)
  *F16B 35/00* (2006.01)
  *F16B 2/06* (2006.01)

(52) U.S. Cl.
  CPC ............. *E21B 33/06* (2013.01); *F16B 9/02* (2013.01); *F16B 2/065* (2013.01); *F16B 9/023* (2013.01); *F16B 35/005* (2013.01); *Y10T 403/7041* (2015.01)

(58) Field of Classification Search
  CPC ........... F16B 9/02; F16B 9/023; E21B 33/038
  USPC .... 403/351, 350, 352, 365; 285/90, 91, 321; 251/1.2
  See application file for complete search history.

(56) References Cited

U.S. PATENT DOCUMENTS

| 3,198,560 | A | * | 8/1965 | Collins | F16L 13/08 285/288.11 |
| 3,232,346 | A | * | 2/1966 | Wakefield, Jr. | E21B 33/038 166/344 |
| 3,326,580 | A | * | 6/1967 | Munier | F16B 21/18 285/192 |
| 3,336,976 | A | * | 8/1967 | Word, Jr. | E21B 33/038 166/336 |
| 3,338,596 | A | * | 8/1967 | Knox | E21B 33/038 285/110 |
| 3,345,087 | A | * | 10/1967 | Hanes | A01K 63/04 285/321 |
| 3,433,504 | A | * | 3/1969 | Hanes | E21B 17/085 285/264 |
| 3,468,558 | A | * | 9/1969 | Ahlstone | E21B 33/043 166/340 |
| 3,941,410 | A | * | 3/1976 | Miyaoka | F16L 21/04 285/321 |
| 4,074,923 | A | * | 2/1978 | Howe, Jr. | F16C 35/063 384/541 |
| 4,438,900 | A | * | 3/1984 | Schaeper | E21B 33/06 251/1.2 |

(Continued)

*Primary Examiner* — Umashankar Venkatesan
(74) *Attorney, Agent, or Firm* — Helene Raybaud

(57) ABSTRACT

A blowout preventer including a top including a chamber and an annular groove extending into a surface of the top, a housing including a chamber and an annular groove extending into a surface of the housing, and a connection assembly configured to releasably couple the top to the housing, the connection assembly including an arcuate ring segment having a radial width that is greater in size than an axial height of the ring segment, and a positioner configured to radially displace the ring segment between a locked position restricting relative axial movement between the top and the housing, and an unlocked position allowing for relative axial movement between the top and the housing.

19 Claims, 17 Drawing Sheets

(56) References Cited

U.S. PATENT DOCUMENTS

| | | | | |
|---|---|---|---|---|
| 4,653,778 A | * | 3/1987 | Alandy | E21B 33/038 166/339 |
| 4,854,765 A | * | 8/1989 | Giles | B64C 1/38 403/30 |
| 5,427,468 A | * | 6/1995 | Muellenberg | F16D 1/04 403/350 |

* cited by examiner

SYSTEMS AND METHODS FOR ASSEMBLING A BLOWOUT PREVENTER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Hydrocarbon drilling systems utilize drilling fluid or mud for drilling a wellbore in a subterranean earthen formation. In some applications, drilling systems include a blowout preventer (BOP) configured to control the inlet and outlet of fluid from the wellbore, and particularly, to confine well fluid in the wellbore in response to a "kick" or rapid influx of formation fluid into the wellbore. An individual BOP stack may include both ram BOPs and annular BOPs. Annular BOPs are configured to close or seal against the outer surface of a drill string extending through the BOP stack.

In some applications, annular BOPs include a hydraulic assembly or package for actuating between an open position allowing for fluid flow in an annulus disposed between the drill string and the annular BOP, and a closed position restricting fluid flow through the annulus. Particularly, the hydraulic package may include an annular packer comprising an elastomeric material that is urged into sealing engagement with the drill string. In some applications, the annular BOP includes an upper housing or top for housing the packer, where the top is releasably coupled to a lower housing to allow for the installation of the hydraulic package therein. In those applications, the annular BOP may include a connection assembly for releasably coupling the top to the lower housing, where the connection assembly is configured to transmit loads applied to the top by the packer, when actuated, to the lower housing.

SUMMARY

An embodiment of a blowout preventer comprises a top comprising a chamber and an annular groove extending into a surface of the top, the chamber of the top configured to receive at least a portion of a packer, a housing comprising a chamber and an annular groove extending into a surface of the housing, the chamber of the housing configured to receive at least portion of an actuation assembly configured to actuate the packer to seal a bore of the blowout preventer, and a connection assembly configured to releasably couple the top to the housing, the connection assembly comprising an arcuate ring segment having a radial width that is greater in size than an axial height of the ring segment, and a positioner configured to radially displace the ring segment between a locked position restricting relative axial movement between the top and the housing, and an unlocked position allowing for relative axial movement between the top and the housing, wherein, when the arcuate ring segment is disposed in the locked position, the arcuate ring segment is disposed in the annular groove of the top and the annular groove of the housing. In some embodiments, the annular groove of the housing extends 360° about a longitudinal axis of the housing, and the annular groove of the top extends 360° about a longitudinal axis of the top. In some embodiments, when the ring segment is disposed in the unlocked position, the ring segment is disposed entirely within the annular groove of the top. In certain embodiments, the positioner comprises a threaded fastener disposed in a radially extending aperture of the arcuate ring segment. In certain embodiments, the threaded fastener threadably engages an inner surface of an aperture extending radially into the top, and in response to rotation of the threaded fastener, the arcuate ring segment is actuated between the locked and unlocked positions. In some embodiments, the blowout preventer further comprises an alignment member extending into the annular groove of the top, wherein the alignment member extends into an alignment groove of the ring segment to restrict relative rotation between the ring segment and the housing. In some embodiments, the connection assembly comprises a plurality of arcuate ring segments, and a plurality of positioners configured to radially displace the ring segments between the locked position and the unlocked position, wherein, when the plurality of arcuate ring segments are disposed in the locked position, the plurality of arcuate ring segments cover a majority of a circumferential length of an annular interface disposed radially between the top and the housing.

An embodiment of a blowout preventer comprises a top comprising a chamber and an annular groove extending into a surface of the top, the chamber of the top configured to receive at least a portion of a packer, a housing comprising a chamber and an annular groove extending into a surface of the housing, the chamber of the housing configured to receive at least portion of an actuation assembly configured to actuate the packer to seal a bore of the blowout preventer, and a connection assembly configured to releasably couple the top to the housing, the connection assembly comprising a plurality of arcuate ring segments, and a plurality of positioners configured to radially displace the ring segments between a locked position restricting relative axial movement between the top and the housing, and an unlocked position allowing for relative axial movement between the top and the housing, wherein, when the plurality of arcuate ring segments are disposed in the locked position, the plurality of arcuate ring segments cover a majority of a circumferential length of an annular interface disposed radially between the top and the housing, wherein, when the plurality of arcuate ring segments are disposed in the locked position, the plurality of arcuate ring segments are disposed in the annular groove of the top and the annular groove of the housing. In some embodiments, each of the plurality of arcuate ring segments comprises a pair of lateral end surfaces, and when the plurality of arcuate ring segments are disposed in the locked position, the lateral end surfaces of each arcuate ring segment engages a lateral end surface of an adjacently positioned arcuate ring segment. In some embodiments, when the plurality of arcuate ring segments are disposed in the locked position, the plurality of arcuate ring segments cover the substantial entirety of the circumferential length of the annular interface disposed radially between the top and the housing. In certain embodiments, each of the plurality of arcuate ring segments comprises an annular upper surface and an annular lower surface, and when the plurality of arcuate ring segments are disposed in the locked position, in response to a first axially directed force applied against the top, the annular lower surface of each of the plurality of ring segment engages an annular lower surface of the annular groove of the top to restrict relative axial movement between the top and the housing. In certain embodiments, when the plurality of arcuate ring segments are disposed in the locked position, in response to the first axially directed force applied against the top, the annular upper surface of each of the plurality of ring segment engages an annular upper surface of the annular groove of the housing to restrict relative axial movement between the top and the housing. In some embodiments, when the plurality of arcuate ring segments are disposed in the locked position, in response to the first axially directed force applied against the top, the first force is circumferentially distributed along a majority of a circumferential length of the upper surface of the annular groove of the housing. In some embodiments, each of the plurality of arcuate ring segments comprises a radial width that is greater in size than an axial height of the ring segment.

An embodiment of a blowout preventer comprises a top comprising a chamber and an annular groove extending into a surface of the top, the chamber of the top configured to receive at least a portion of a packer, a housing comprising a chamber and an annular groove extending into a surface of the housing, the chamber of the housing configured to receive at least portion of an actuation assembly configured to actuate the packer to seal a bore of the blowout preventer, and a connection assembly configured to releasably couple the top to the housing, the connection assembly comprising an arcuate ring segment comprising an annular upper surface and an annular lower surface, and a positioner configured to radially displace the ring segment between a locked position restricting relative axial movement between the top and the housing, and an unlocked position allowing for relative axial movement between the top and the housing, wherein, when the arcuate ring segment is disposed in the locked position, the arcuate ring segment is disposed in the annular groove of the top and the annular groove of the housing, wherein, when the arcuate ring segment is disposed in the locked position, in response to a first axially directed force applied against the top, the annular lower surface of the ring segment engages an annular lower surface of the annular groove of the top to restrict relative axial movement between the top and the housing. In some embodiments, when the arcuate ring segment is disposed in the locked position, in response to the first axially directed force applied against the top, the annular upper surface of the ring segment engages an annular upper surface of the annular groove of the housing to restrict relative axial movement between the top and the housing. In some embodiments, when the arcuate ring segment is disposed in the locked position, in response to a second axially directed force applied against the top, the annular upper surface of the ring segment engages an annular upper surface of the annular groove of the top. In certain embodiments, when the arcuate ring segment is disposed in the locked position, in response to the second axially directed force applied against the top, the annular lower surface of the ring segment engages an annular lower surface of the annular groove of the housing. In certain embodiments, the arcuate ring segment comprises a radial width that is greater in size than an axial height of the ring segment. In some embodiments, the connection assembly comprises a plurality of arcuate ring segments, and a plurality of positioners configured to radially displace the ring segments between the locked position and the unlocked position, wherein, when the plurality of arcuate ring segments are disposed in the locked position, the plurality of arcuate ring segments cover a majority of a circumferential length of an annular interface disposed radially between the top and the housing.

BRIEF DESCRIPTION OF THE DRAWINGS

For a detailed description of exemplary embodiments, reference will now be made to the accompanying drawings in which.

DETAILED DESCRIPTION

Figure 1:
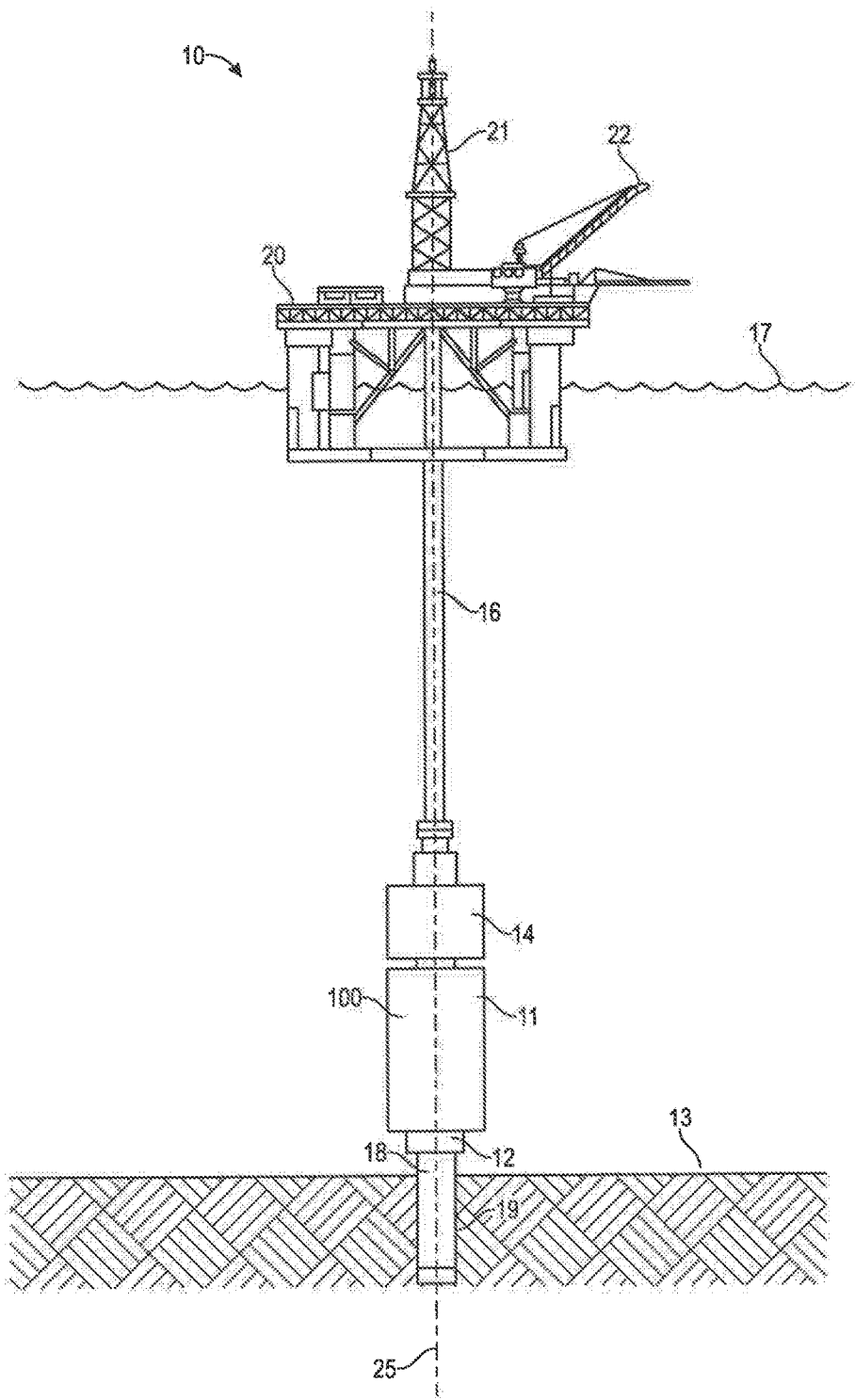
FIG. 1 is a schematic view of an embodiment of an offshore well system for drilling and/or production of hydrocarbons in accordance with principles disclosed herein.

In the drawings and description that follow, like parts are typically marked throughout the specification and drawings with the same reference numerals. The drawing figures are not necessarily to scale. Certain features of the disclosed embodiments may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below may be employed separately or in any suitable combination to produce desired results.

Unless otherwise specified, in the following discussion and in the claims, the terms "including" and "comprising" are used in an open-ended fashion, and thus should be interpreted to mean "including, but not limited to . . . ". Any use of any form of the terms "connect", "engage", "couple", "attach", or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

Referring now to FIG. 1, an embodiment of an offshore well system 10 for drilling and/or producing a subsea well is shown. In this embodiment, system 10 includes a subsea blowout preventer (BOP) stack 11 mounted to a wellhead 12 at the sea floor 13. Stack 11 includes an annular BOP 100 coupled to a lower marine riser package (LMRP) 14 connected to the upper end of BOP stack 11. A marine riser 16 extends from a surface vessel 20 at the sea surface or waterline 17 to LMRP 14. In this embodiment, vessel 20 is a floating platform, and thus, may also be referred to as platform 20. In other embodiments, the vessel (e.g., vessel 20) can be a drill ship or any other vessel disposed at the sea surface for conducting offshore drilling and/or production operations. Platform 20 includes a drilling derrick 21 and a lifting device 22. Riser 16 is a large-diameter pipe that connects LMRP 14 to floating platform 20. During drilling operations, riser 16 takes mud returns to platform 20. Further, riser 16 is coupled to electrical and hydraulic lines (not shown) for powering and controlling the actuation of components of BOP stack 11, including a subsea component or annular BOP 100. A primary conductor 18 extends from wellhead 12 into the subterranean wellbore 19. In the embodiment shown, BOP stack 11 (including annular BOP 100), LMRP 14, wellhead 12, and conductor 18 are arranged such that each shares a common central axis 25. In other words, BOP stack 11, LMRP 14, wellhead 12, and conductor 18 are coaxially aligned. In addition, BOP stack 11, LMRP 14, wellhead 12, and conductor 18 are vertically stacked one-above-the-other, and the position of platform 20 is controlled such that axis 25 is vertically or substantially vertically oriented. Although in the embodiment shown in FIG. 1 well system 10 comprises an offshore well system, in other embodiments, well system 10 may comprise a land-based well system configured for drilling and/or producing a subterranean well.

Figure 2:
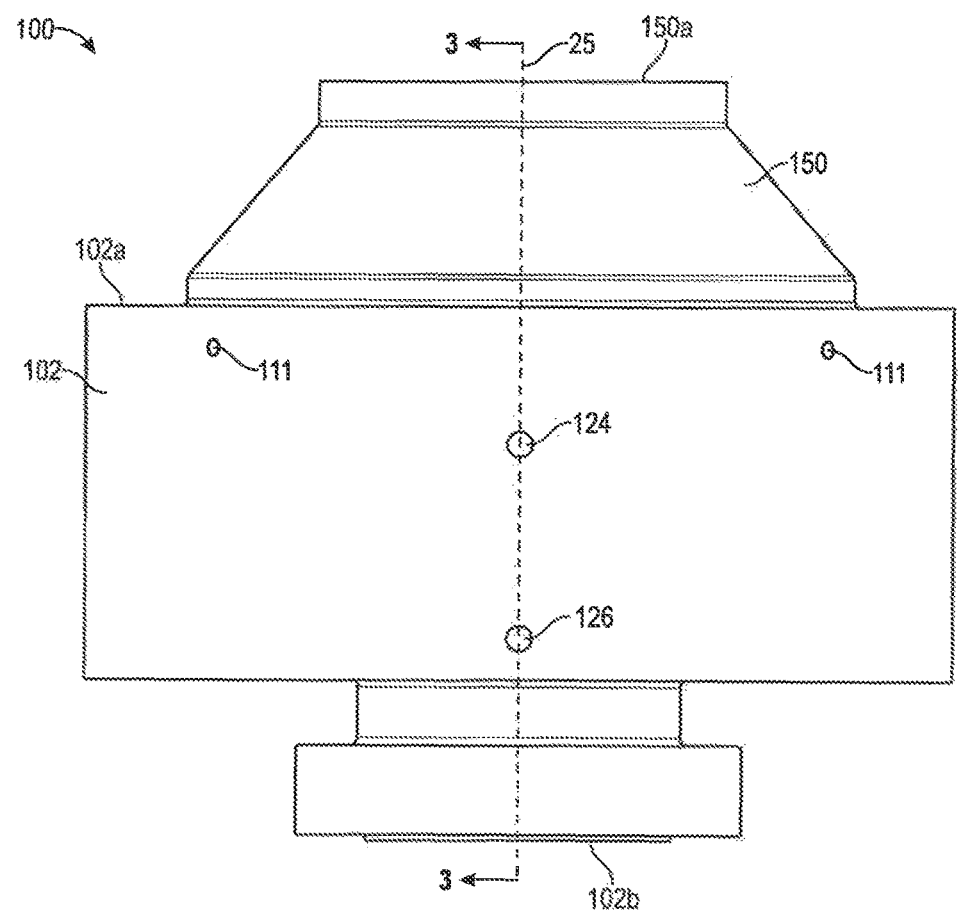
FIG. 2 is a side view of an embodiment of an annular blowout preventer (BOP) of the well system of FIG. 1 in accordance with principles disclosed herein.
Figure 3:
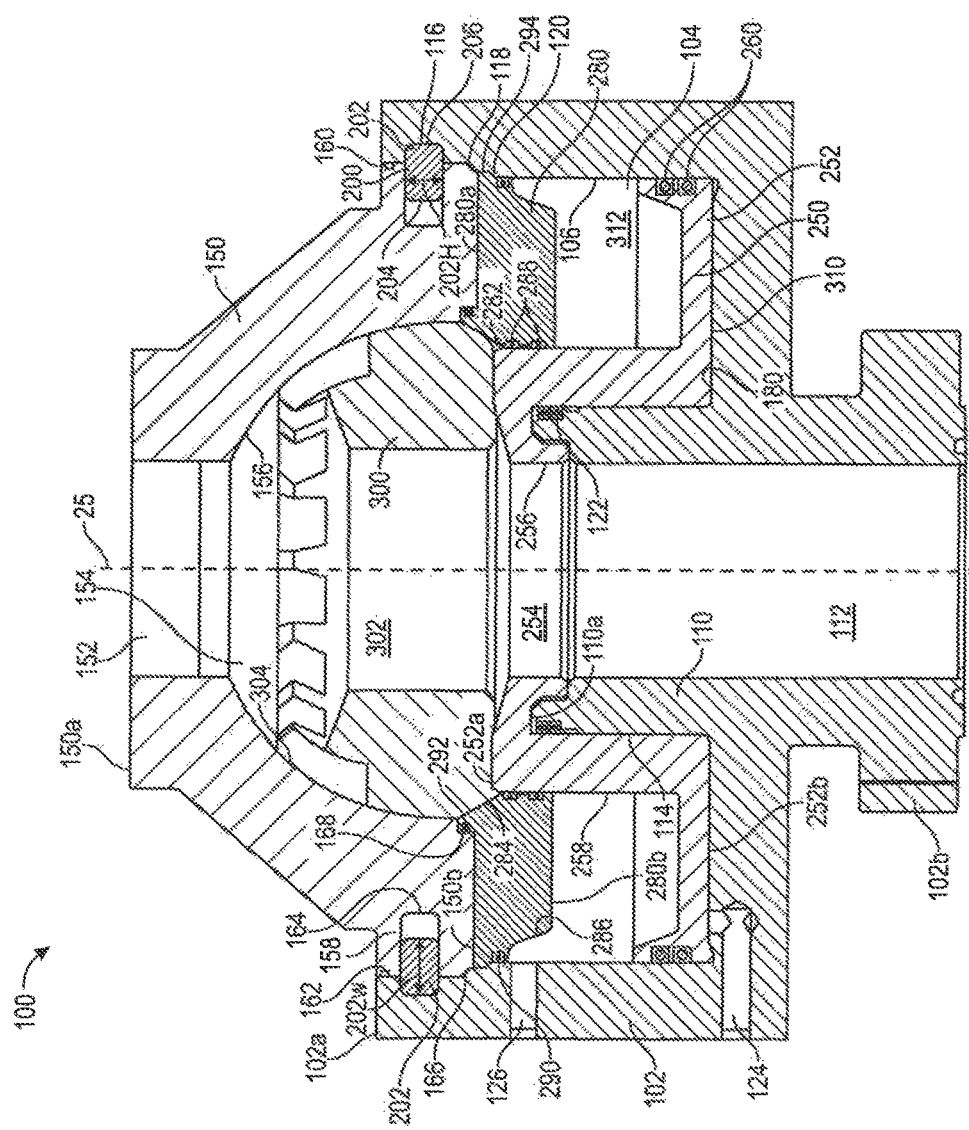
FIG. 3 is a side cross-sectional view of the annular BOP of FIG. 2 along line 3-3 of FIG. 2.
Figure 4:
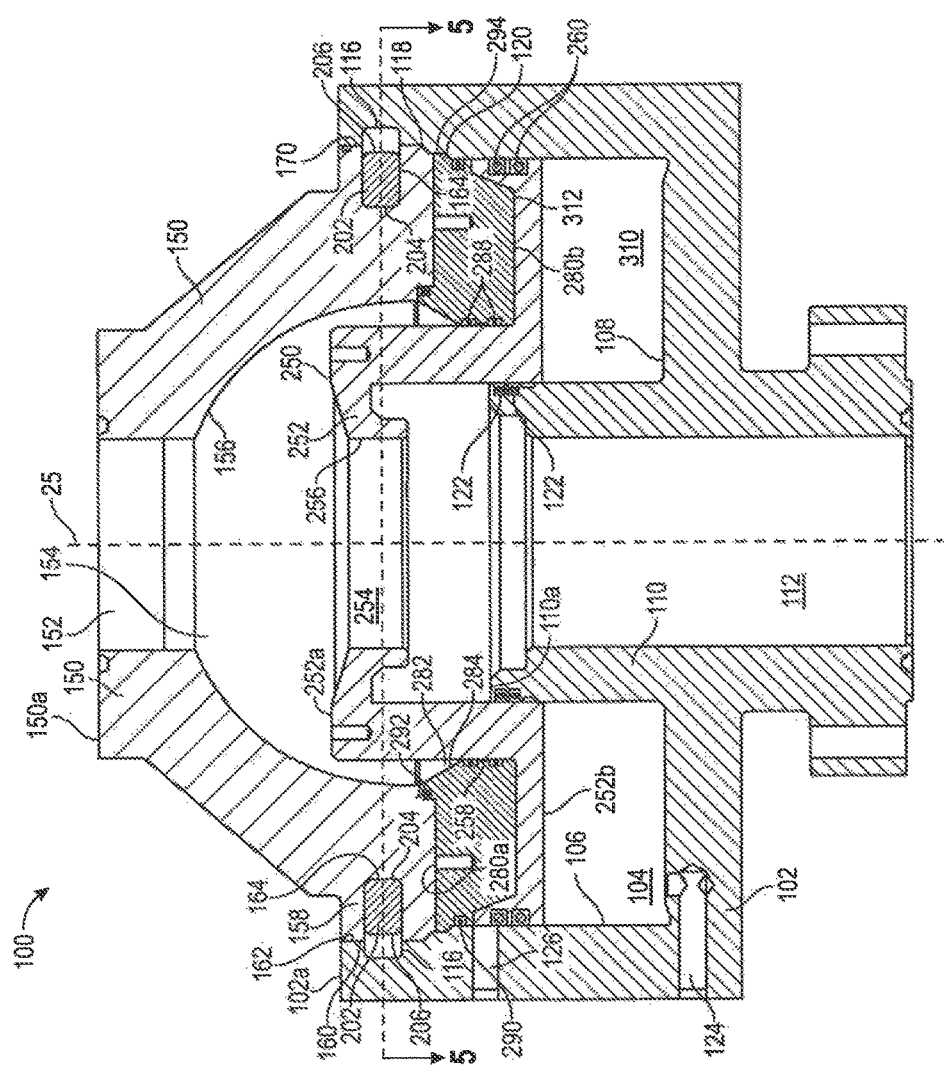
FIG. 4 is another side cross-sectional view of the annular BOP of FIG. 2 along line 3-3 of FIG. 2.

Referring to FIGS. 2 and 3, an embodiment of annular BOP 100 is shown. In this embodiment, annular BOP 100 generally includes an outer housing 102, an upper housing or top 150, a releasable connection assembly 200, and an actuation assembly 250 including an annular piston 252, an annular positioning sleeve 280, and a packer or sealing member 300. Housing 102 and top 150 are configured to receive and house the actuation assembly 250, which is configured to actuate between an unsealed or open position and a sealed or closed position (shown without packer 300 in FIG. 4), as will be discussed further herein. Connection assembly 200 is configured to releasably connect top 150 to housing 102. Housing 102 and top 150 include longitudinal axes disposed coaxially with longitudinal axis 25 when housing 102 and top 150 are coupled together via connection assembly 200. As will be discussed further herein, connection assembly 200 is configured to maximize the strength or integrity of the connection formed between housing 102 and top 150 while providing for a convenient and time-efficient mechanism for coupling and decoupling top 150 from housing 102.

In the embodiment shown, housing 102 has a first or upper end 102a, a second or lower end 102b, and a bore or chamber 104 extending axially (relative longitudinal axis 25) into housing 102 from upper end 102a. Chamber 104 is at least partially defined by an axially extending generally cylindrical surface 106 extending from upper end 102a, and an annular seating surface 108 that extends radially inwards from a lower end of cylindrical surface 106. In this embodiment, housing 102 also includes a cylindrical extension 110 that extends axially from seating surface 108 and includes a central throughbore or passage 112 extending therethrough and a generally cylindrical outer surface 114, where outer surface 114 also at least partially defines chamber 104 of housing 102.

In this embodiment, the inner surface 106 of chamber 104 includes an annular groove 116 extending radially therein and disposed proximal upper end 102a. In certain embodiments, annular groove 116 extends 360° about the longitudinal axis of housing 102. As will be discussed further herein, groove 116 is configured to receive a portion of connection assembly 200 for releasably coupling top 150 to housing 102. Inner surface 106 also includes a first or upper annular shoulder 118 extending radially inwards into chamber 104, and a second or lower annular shoulder 120 extending further radially inwards into chamber 104, where annular shoulders 118 and 120 are disposed axially proximal annular groove 116. In this embodiment, the outer surface 114 of extension 110 includes a pair of annular seals 122 disposed radially therein and at an upper end 110a of extension 110. Housing 102 also includes a first or closing port 124 that extends from seating surface 108 to an outer surface of housing 102, and a second or opening port 126 extending from cylindrical inner surface 106 to the outer surface of housing 102. In this configuration, ports 124 and 126 are configured to provide selectable fluid communication between chamber 104 and control lines or fluid passages connected to ports 124 and 126. As will be discussed further herein, ports 124 and 126 provide selectably pressurizable fluid conduits for actuating the actuation assembly 250 between the open and closed positions.

In the embodiment shown, chamber 104 of housing 102 receives piston 252 and sleeve 280 of actuation assembly 250 while top 150 receives packer 300. In this embodiment, top 150 includes a first or upper end 150a, a second or lower end 150b, a central bore or passage 152 extending axially into top 150 from upper end 150a, and a centrally disposed hemispherical chamber 154 extending axially into top 150 from lower end 150b and defined by a generally hemispherical inner surface 156. Top 150 also includes a radially outwards extending annular flange 158 disposed at lower end 150b that includes a generally cylindrical outer surface 160. In the embodiment shown, the outer surface 160 of flange 158 includes an annular seal 162 extending therein and disposed proximal an axially upper end of flange 158. Annular seal 162 sealingly engages the inner surface 106 of the chamber 104 of housing 102 when top 150 is seated against housing 102 as shown in FIG. 3. Outer surface 160 of flange 158 also includes an annular groove 164 extending therein and disposed axially between annular seal 162 and lower end 150b of top 150, where annular groove 164 is configured to receive a portion of connection assembly 200 to releasably couple top 150 to housing 102. In certain embodiments, annular groove 164 extends 360° about the longitudinal axis of top 150. In addition, outer surface 160 of flange 158 includes a radially inwards extending annular shoulder 166 disposed proximal lower end 150b. Annular shoulder 166 of flange 158 matingly seats against the upper shoulder 118 of housing 102 when top 150 is seated against housing 102, as shown in FIG. 3. Further, the inner surface 156 of hemispherical chamber 154 includes a radially outwards extending annular shoulder 168 also disposed proximal lower end 150b.

In the embodiment shown in FIGS. 2 and 3, annular piston 252 of actuation assembly 250 is generally hub-shaped and includes a first or upper end 252a, a second or lower end 252b, a central bore 254 defined by an inner surface 256 extending between ends 252a and 252b, and an outer surface 258 extending between ends 252a and 252b. Outer surface 258 includes a pair of annular seals 260 disposed therein and positioned proximal lower end 252a, where seals 260 sealingly engages the inner surface 106 of the chamber 104 of housing 102 when piston 252 is received within chamber 104. In addition, the inner surface 256 of piston 252 is sealingly engaged by the annular seals 122 of housing 102 when piston 252 is disposed within the chamber 104 of housing 102.

Positioning sleeve 280 of actuation assembly 250 is disposed radially between the inner surface 106 of the chamber 104 of housing 102 and the outer surface 258 of piston 252 when actuation assembly 250 is disposed within annular BOP 100. In the embodiment shown, positioning sleeve 280 includes a first or upper end 280a, a second or lower end 280b, a central bore 282 defined by an inner surface 284 extending between ends 280a and 280b, and an outer surface 286 extending between ends 280a and 280b. The inner surface 284 of positioning sleeve 280 includes a pair of annular seals 288 disposed therein that sealingly engage the outer surface 258 of piston 252. In addition, the outer surface 286 of positioning sleeve 280 includes an annular seal 290 that sealingly engages the inner surface 106 of chamber 104 when positioning sleeve 280 is received within chamber 105 of housing 102. Outer surface 286 further includes an annular seal 292 disposed at upper end 280a that sealingly engages the inner surface 156 of the hemispherical chamber 154 of top 150. Moreover, outer surface 286 includes an annular shoulder 294 extending radially therein and configured to matingly engage the second shoulder 120 of housing 102 when sleeve 280 is received within the chamber 104 of housing 102.

Packer 300 of actuation assembly 250 is configured to selectably seal or restrict fluid communication between passage 152 of top 150 and the passage 112 of housing 102 when there is no tubular member extending through annular BOP 100. Packer 300 is further configured to selectably seal or restrict fluid communication between an annulus extending in passage 152 and an annulus extending through passage 112 when a tubular member (not shown) extends through BOP 100. In the embodiment shown, packer 300 has a central bore 302 and an outer surface 304 that sealingly engages the inner surface 156 of the hemispherical chamber 154 of top 150. In this arrangement, a lower end of packer 300 is physically supported or engaged by the upper end 252a of piston 252.

As shown in FIG. 3, the sealing engagement provided by the annular seals 122 of housing 102 and the seals 260 of piston 252 forms or defines a closing chamber 310 within the chamber 104 of housing 102, where the closing chamber 310 extends between the lower end 252b of piston 252 and the seating surface 108 of housing 102. In addition, the sealing engagement provided by the annular seals 288, 290, and 292 of positioning sleeve 280, and the annular seal 162 of top 150 form or define an opening chamber 312 within the chamber 104 of housing 102, where opening chamber 312 extends between the lower end 280b of positioning sleeve 280 and the outer surface 258 of piston 252. In response to the concurrent pressurization of closing chamber 310 via closing port 124 and the depressurization of opening chamber 312 via opening port 126, piston 252 is displaced axially through chamber 104 towards packer 300, thereby actuating actuation assembly 250 into the closed position with packer 300 sealing passage 152. Conversely, in response to the concurrent pressurization of opening chamber 312 via opening port 126 and the depressurization of closing chamber 310 via closing port 124, piston 252 is displaced through chamber 104 towards seating surface 108, thereby actuating the actuation assembly 250 into the open position.

Referring to FIGS. 3-10, connection assembly 200 of annular BOP 100 is configured to releasably couple or secure top 150 to housing 102. In the embodiment shown, connection assembly 200 generally includes a plurality of circumferentially positioned arcuate ring segments 202, a plurality of circumferentially spaced positioners 230 (shown in FIGS. 5, 6, and 9), and a plurality of circumferentially spaced alignment members 240 (shown in FIGS. 7 and 8A-8C). Ring segments 202 are configured to selectably or releasably lock top 150 to housing 102 via creating a mechanical interference between top 150 and housing 102. Each positioner 230 is configured to control and manipulate the radial positioning (i.e., respective longitudinal axis 25) of a corresponding arcuate ring segment 202 coupled thereto. Particularly, each positioner 230 is configured to actuate a corresponding ring segment 202 between a radially inner or unlocked position (shown in FIGS. 4 and 5), and a radially outer locked position (shown in FIGS. 3, 6, 8, and 9). In the embodiment shown, connection assembly 200 comprises four arcuate ring segments 202; however, in other embodiments, connection assembly 200 may comprise varying numbers of circumferentially positioned ring segments 202. In addition, although connection assembly 200 is shown as including one positioner 230 for each ring segment 202, in other embodiments, multiple positioners 230 may be used to position each ring segment 202.

In the embodiment shown, each ring segment 202 includes a radially inner curved surface 204 (shown in FIGS. 5 and 6), a radially outer curved surface 206, and a pair of lateral end surfaces 208 extending between radial surfaces 204 and 206. In addition, each ring segment 202 includes a bore or aperture 210 extending radially between inner surface 204 and outer surface 206. In the embodiment shown, bore 210 is disposed substantially equidistant between lateral surfaces 208; however, in other embodiments, bore 210 may be positioned at various locations within ring segment 202. In addition, each ring segment 202 includes a counterbore 212 aligned with bore 210 and extending partially into the ring segment 202 from radially outer surface 206. In the embodiment shown, each ring segment 202 has a rectangular cross-sectional area including an axially extending (respective longitudinal axis 25) height 202H and a radially extending width 202W (i.e., extending between surfaces 204 and 206), where the width 202W of each ring segment 202 is greater than the height 202H. Although in the embodiment shown each ring segment 202 includes a rectangular cross-sectional area and a width 202W that is greater than a height 202H, in other embodiments, ring segment 202 may comprise varying cross-sectional shapes and dimensions.

In the embodiment shown, the annular groove 164 of top 150 includes a radially inner cylindrical surface 165 and a plurality of circumferentially spaced threaded apertures 167 extending therein. Particularly, each threaded aperture 167 is circumferentially aligned with the bore 210 of a corresponding arcuate ring segment 202. In this embodiment, each positioner 230 comprises a threaded fastener including a radially outer end or head 232 and a threaded shank or cylindrical member 234 extending from head 232. For each arcuate ring segment 202, the head 232 of positioner 230 is received within counterbore 212 while threaded shank 234 extends radially from inner surface 204 and is received within a threaded aperture 167 of top 150 to threadably connect or couple the positioner 230 to top 150. In this manner, each ring segment 202 is coupled with and circumferentially positioned respective top 150. Thus, connection assembly 200 may be quickly and conveniently actuated between locked and unlocked positions via manipulating the plurality of positioners 230.

The head 232 of each positioner 230 is configured to receive a tool for rotating positioner 230, where rotation of positioner 230 causes positioner 230 to be displaced or actuated radially inwards or outwards relative top 150 in conjunction with the arcuate ring segment 202 coupled thereto. In certain embodiments, an outer surface of shank 234 physically interlocks or couples with an inner surface of bore 210 to restrict relative radial movement between the ring segment 202 and corresponding positioner 230. In the embodiment shown, housing 102 includes a plurality of circumferentially spaced apertures 111 extending radially outwards from an inner surface 117 of annular groove 116. Apertures 111 of housing 102 are axially aligned with positioners 230 when top 150 is seated within housing 102, and apertures 111 may be circumferentially aligned with counterbores 212 of ring segments 202 to provide access for rotating positioners 230. Although in the embodiment shown positioners 230 comprise threaded fasteners, in other embodiments, positioners 230 may comprise other mechanisms for displacing ring segments 202 between radially outer and radially inner positions, such as pistons, electrically actuators, or other mechanisms known in the art. For instance, in certain embodiments, positioners 230 may comprise hydraulic forts for routing pressurized fluid to segments 202 for applying a pressure force thereagainst.

Figure 5:
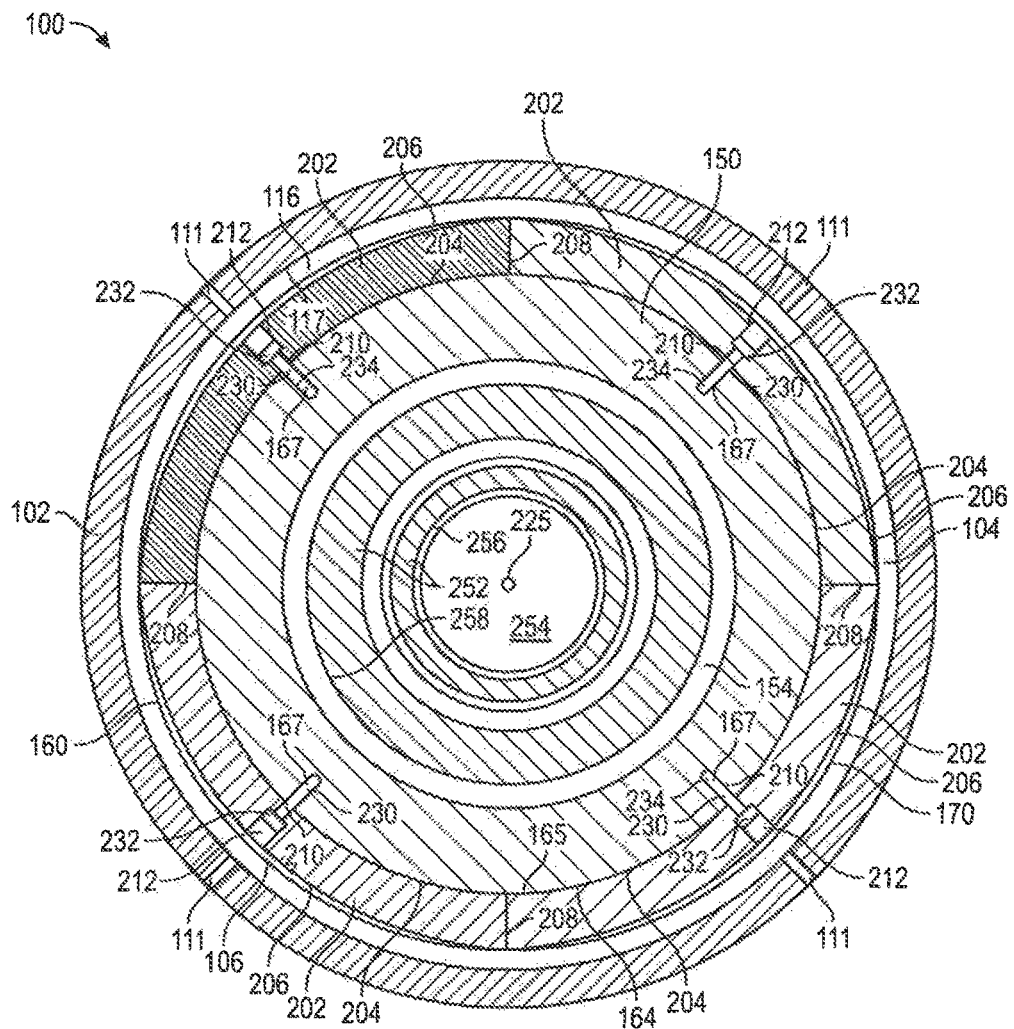
FIG. 5 is a top cross-sectional view of the annular BOP of FIG. 2 along line 5-5 of FIG. 4.

As shown particularly in FIG. 5, when connection assembly 200 is disposed in the unlocked position, the radially inner surface 204 of each ring segment 202 is disposed directly adjacent or physically engages the inner surface 165 of the annular groove 164 of top 150 while the radially outer surface 206 is disposed distal the inner surface 117 of the annular groove 116 of housing 102. In this position, the radially outer surface 206 of each ring segment 202 is disposed radially inwards from, or is radially aligned with, the inner surface 106 of the chamber 104 of housing 102, such that each ring segment 202 is disposed entirely within annular groove 164 of top 150. In this position, connection assembly 200 allows for relative axial movement between top 150 and housing 102 such that top 150 may be installed within or removed from the chamber 104 of housing 102. Further, in the unlocked position, the lateral end surfaces 208 of each ring segment 202 are disposed directly adjacent or physically engage a lateral end surface 208 of a circumferentially adjacent ring segment 202.

Figure 6:
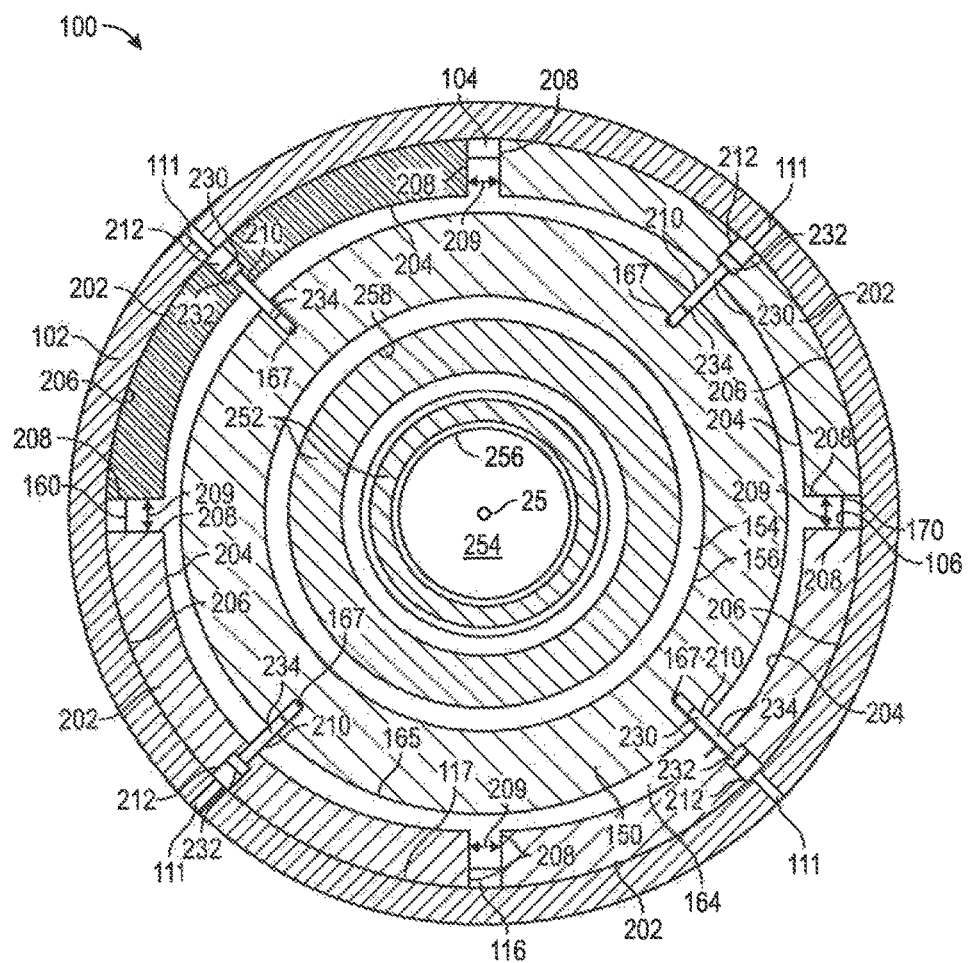
FIG. 6 is another top cross-sectional view of the annular BOP of FIG. 2 along line 5-5 of FIG. 4.

Conversely, as shown particularly in FIG. 6, when connection assembly 200 is disposed in the locked position, the radially inner surface 204 of each ring segment 202 is disposed distal the inner surface 165 of annular groove 164 while radially outer surface 206 is disposed directly adjacent or physically engages the inner surface 117 of annular groove 116. In this position, each ring segment 202 overlaps or extends radially across an interface 170 disposed between the outer surface 160 of top 150 and the inner surface 106 of housing 102, thereby restricting relative axial movement between top 150 and housing 102. In this embodiment, annular groove 164 has a greater radial width than annular groove 116, thus positioning connection assembly 200 in the locked position when arcuate ring segments 202 are disposed in the radially outwards position. Further, in the locked position, a circumferentially extending gap 209 extends between lateral end surfaces 208 of each circumferentially adjacent ring segment 202. However, although circumferential gap 209 extends between ring segments 202 when connection assembly 250 is disposed in the locked position, the majority of the circumferential length of interface 170 is engaged or covered by arcuate ring segments 202 given that each segment 202 has a greater arcuate length (i.e., the arcuate length between lateral end surfaces 208) than the arcuate length of circumferential gap 109.

Figure 7:
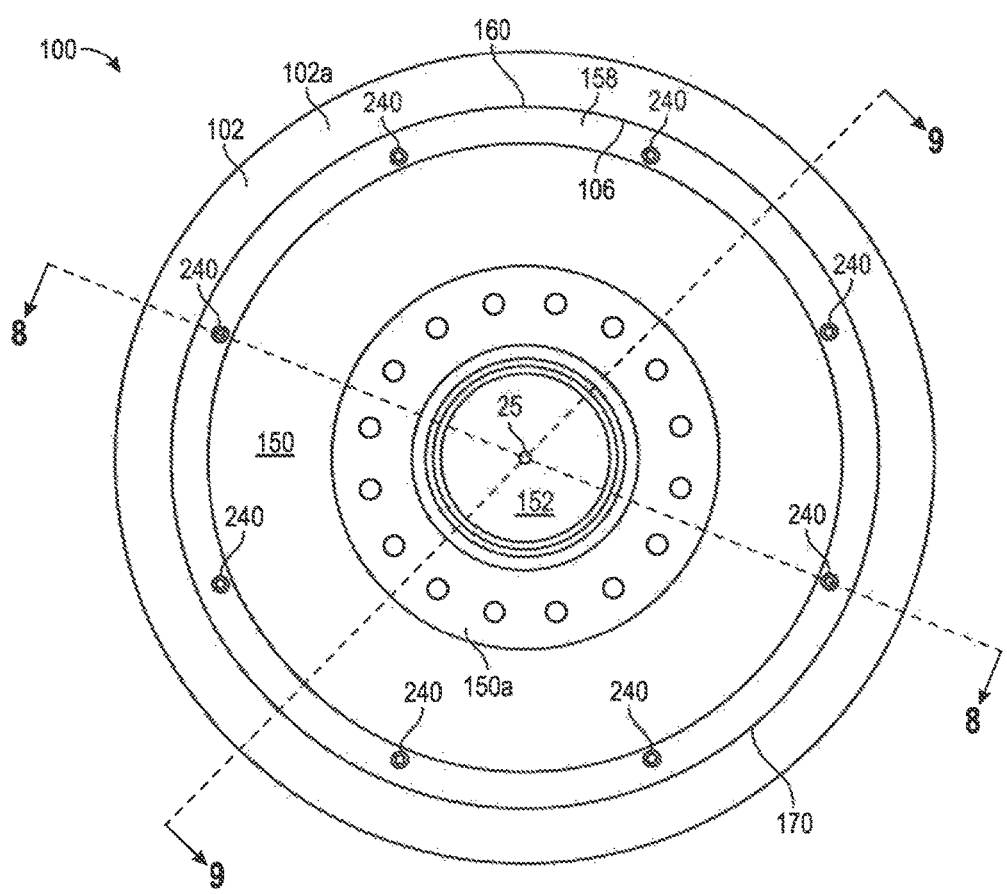
FIG. 7 is a top view of the annular BOP of FIG. 2.
Figure 8A:
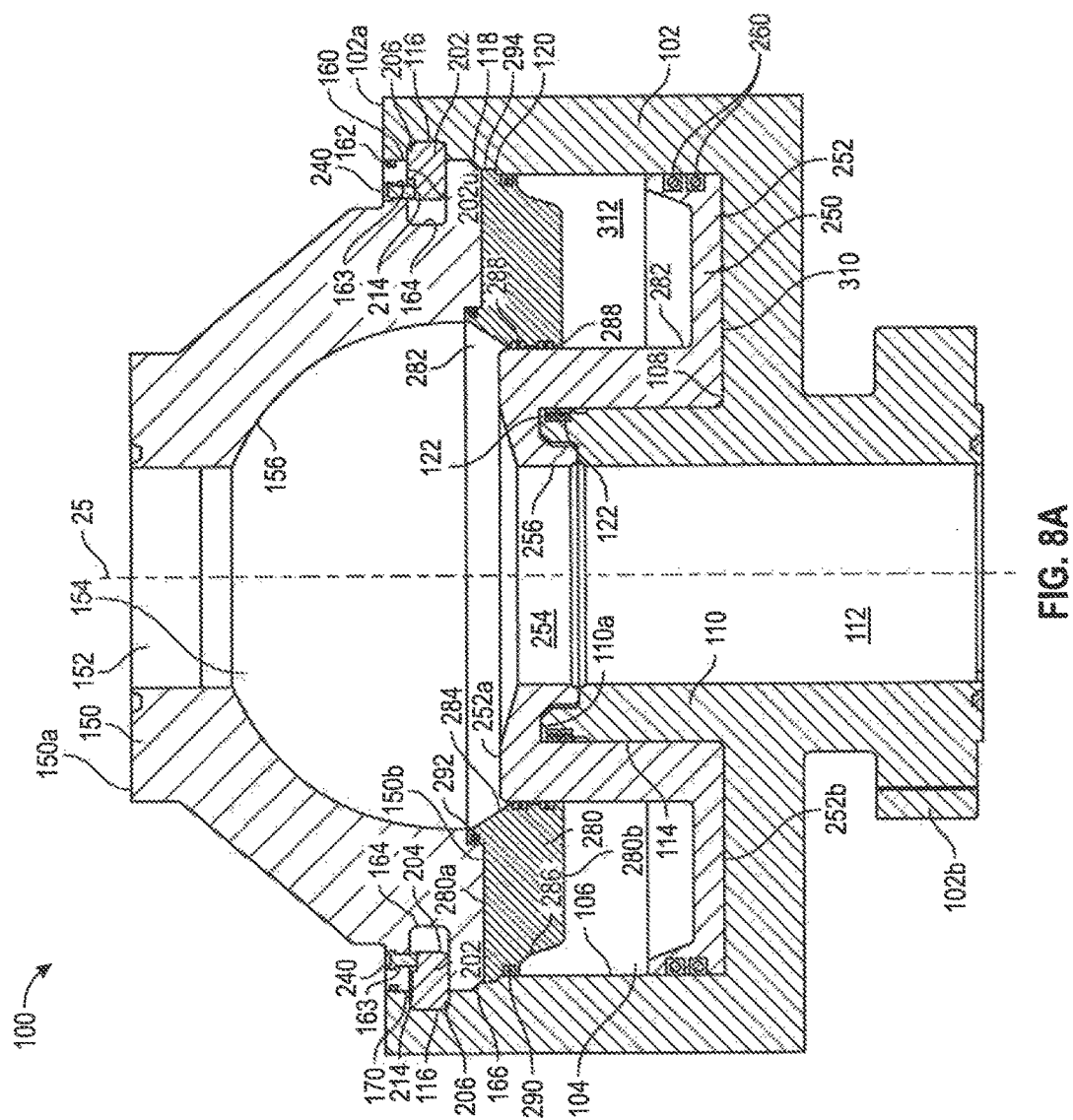
FIG. 8A is a side cross-sectional view of the annular BOP of FIG. 2 along line 8-8 of FIG. 7.
Figure 8B:
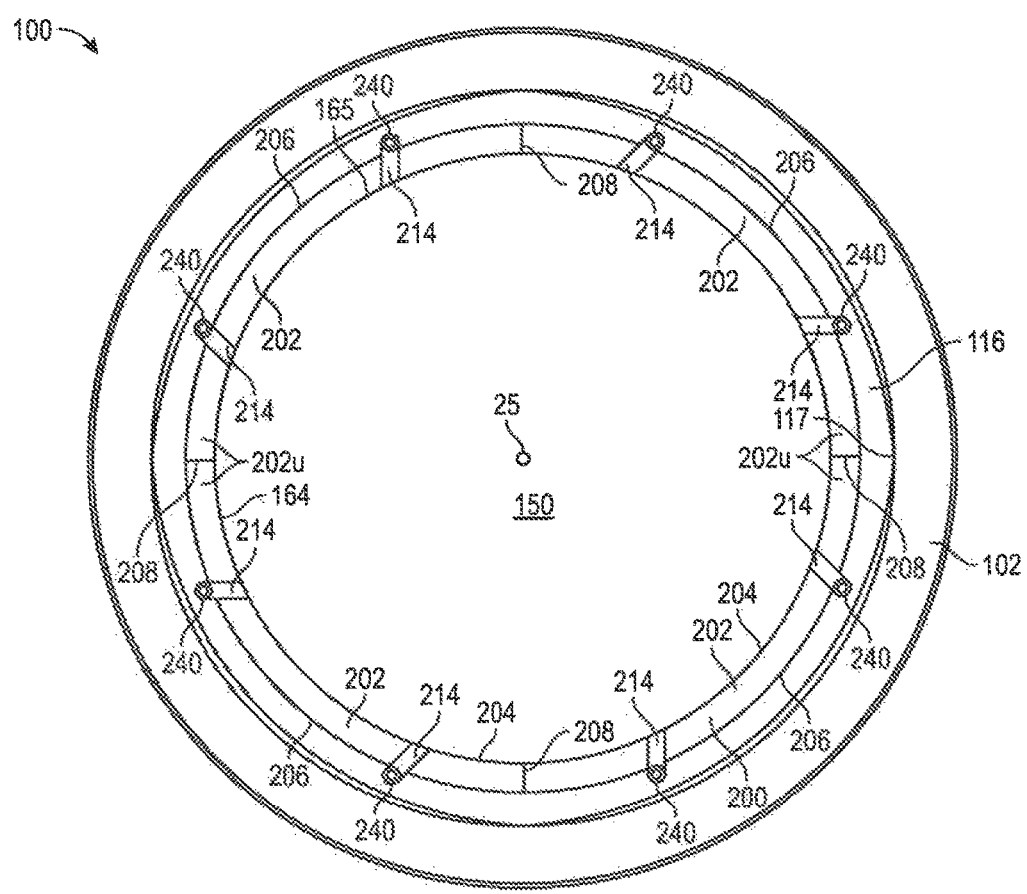
FIGS. 8B and 8C are schematic top views of the annular BOP of FIG. 2 in accordance with principles disclosed herein.
Figure 8C:
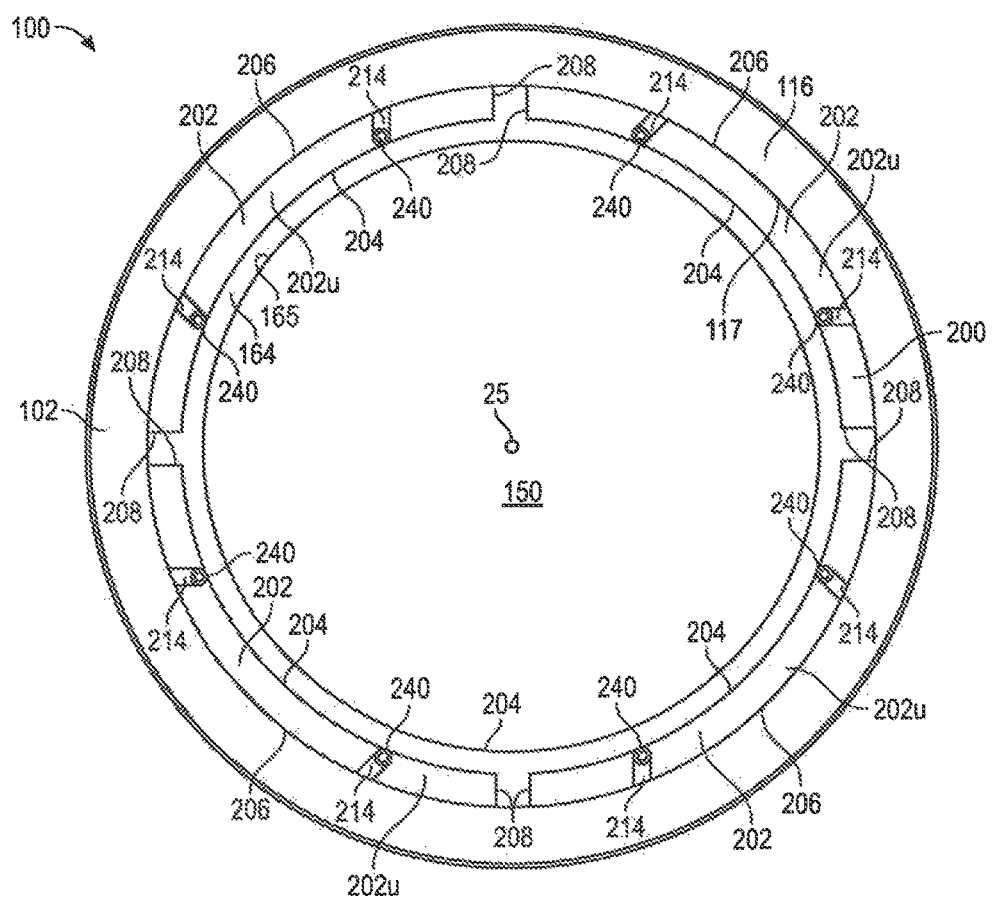
Figure 9:
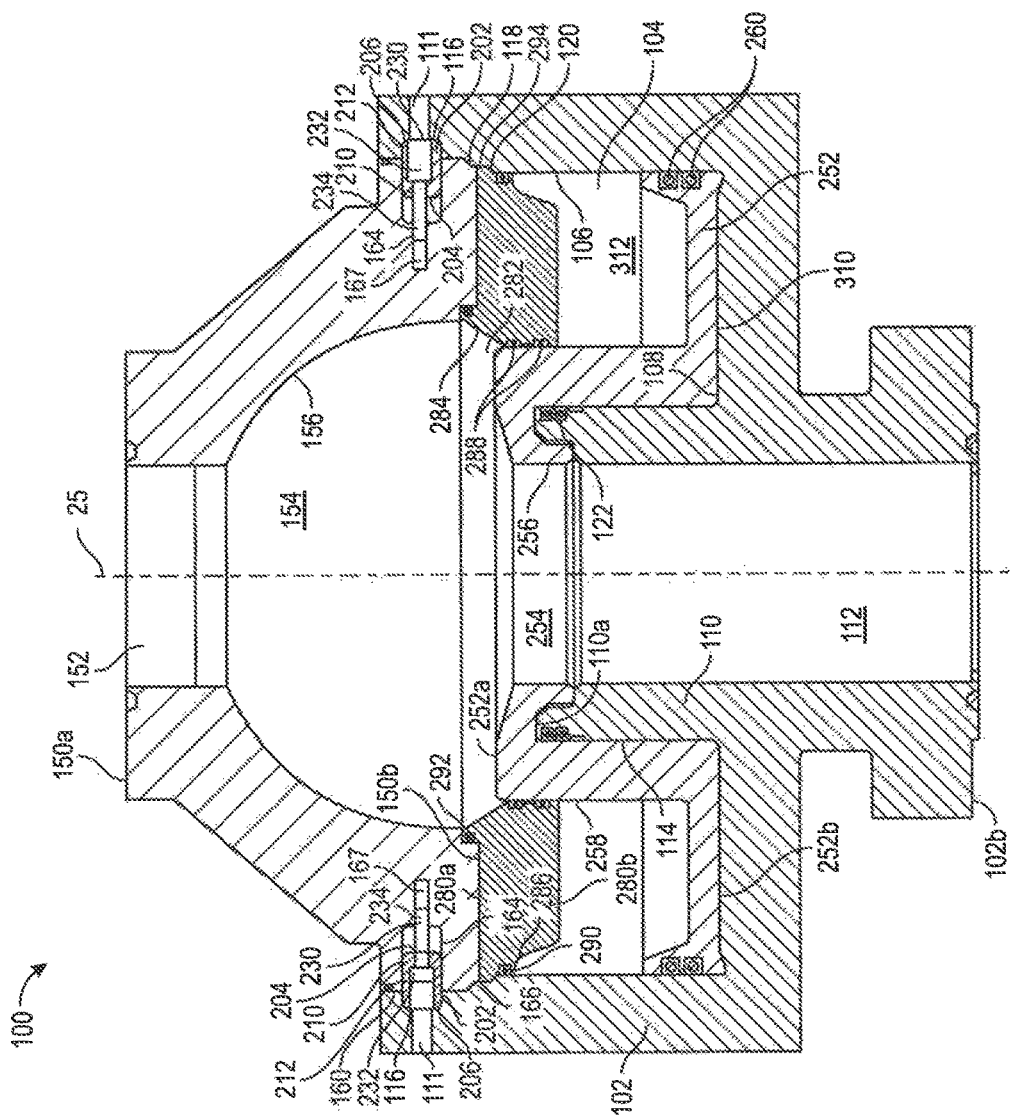
FIG. 9 is a side cross-sectional view of the annular BOP of FIG. 2 along line 9-9 of FIG. 7.

As shown particularly in FIGS. 7 and 8, once connection assembly 200 and segments 202 are disposed in the locked position restricting relative axial movement between top 150 and housing 102, segments 202 may be locked or held in the locked position to prevent inadvertent decoupling of top 150 and housing 102, and/or to restrict relative rotation between top 150 and housing 102 using alignment members 240. In the embodiment shown, each alignment member 240 comprises a threaded fastener that threadably connects and extends through a corresponding threaded aperture 163 of top 150, where apertures 163 are circumferentially spaced about longitudinal axis 25 of annular BOP 100 and extend axially between an upper surface of flange 158 and the annular groove 164. In this embodiment, each arcuate ring segment 202 includes a pair of circumferentially spaced alignment grooves 214 disposed in an upper surface 202U of the ring segment 202. As shown in the schematic views of FIGS. 8B (showing ring segments 202 in the unlocked position) and 8C (showing ring segments 202 in the locked position), each alignment groove 214 extends radially between the inner surface 204 and outer surface 206 of an arcuate ring segment 202. Particularly, each ring segment 202 includes a pair of alignment grooves 214 orientated or extending in the same radial direction. In this configuration, relative rotation or pivoting between each ring segment 202 and both top 150 and housing 102 as ring segments 202 are displaced between the locked and unlocked positions. In other words, physical engagement between alignment members 240 and corresponding alignment grooves 214 only allow for relative radial movement between ring segments 202 and top 150 and housing 102 along a radial axis (each ring segment 202 moving along a separate radial axis) intersecting longitudinal axis 25. Restricting relative rotation or pivoting between ring segments 202 and the top 150 and housing 102 prevents against partial displacement of ring segments 202 between their locked and unlocked positions.

As discussed above, when actuation assembly 250 is actuated into the closed position piston 252 is displaced upwards through chamber 104 of housing 102, actuating packer 300. In the closed position, the pressure force applied to piston 250 via closing chamber 310 is transmitted to top 150 via engagement between top 150 and packer 300, and possible engagement between piston 252 and positioning sleeve 280, which is, in this embodiment, coupled to top 150 via a plurality of circumferentially spaced fasteners (not shown). The axially upwards directed force applied against top 150 is resisted via the interlocking engagement provided by arcuate ring segments 202 of connection assembly 200 when assembly 200 is disposed in the locked position.

Figure 10:
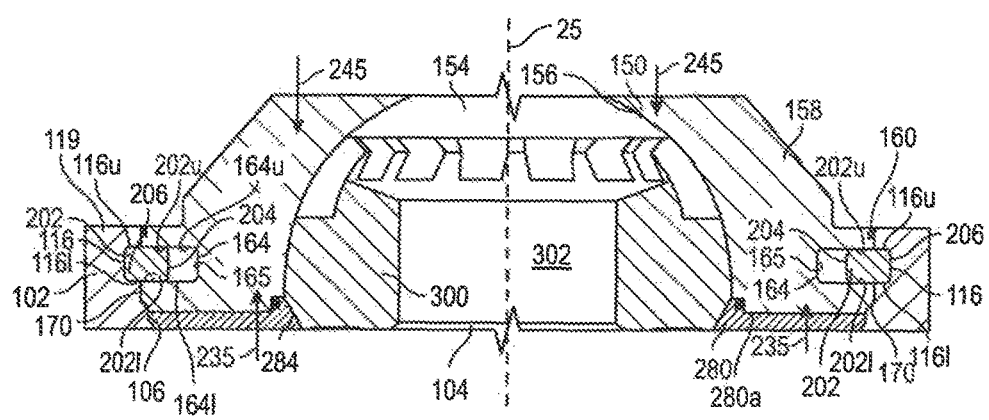
FIG. 10 is a zoomed-in side cross-sectional view of the annular BOP of FIG. 2.
Figure 11:
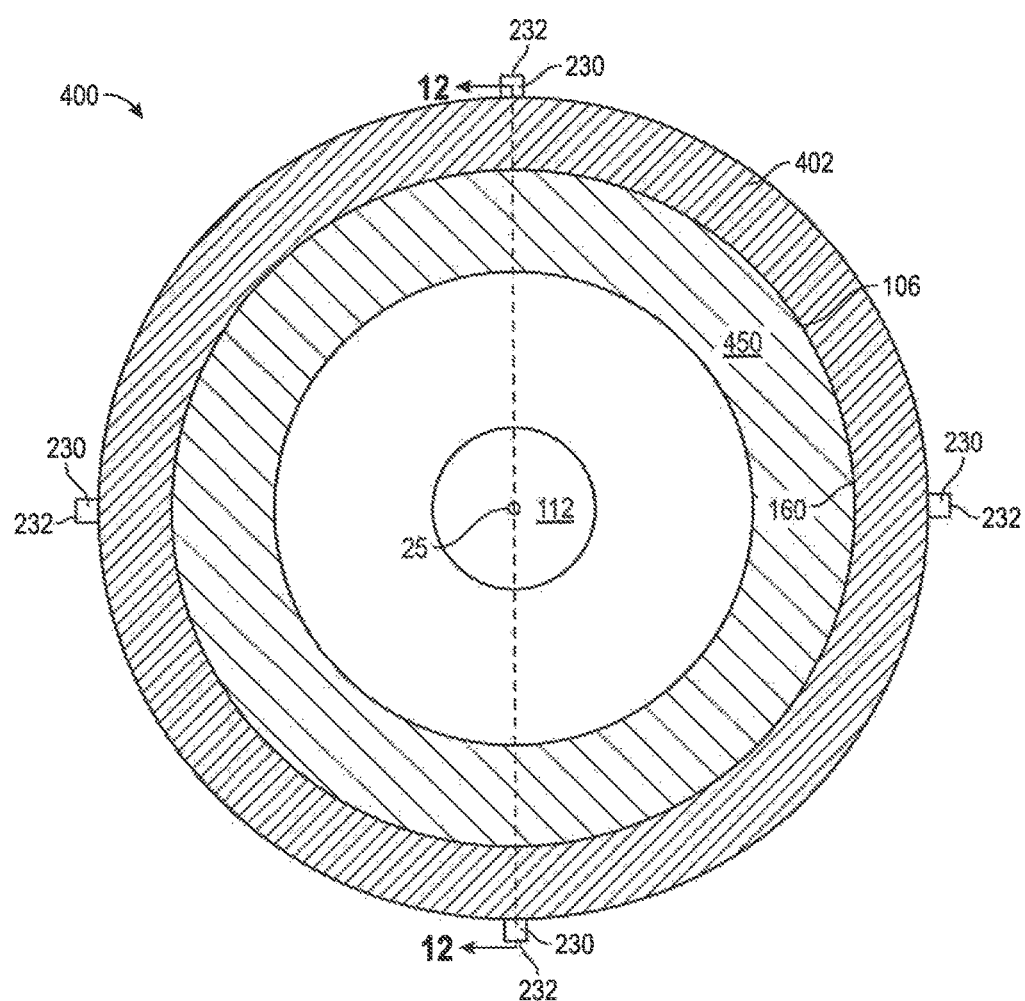
FIG. 11 is a top view of another embodiment of an annular BOP of the well system of FIG. 1 in accordance with principles disclosed herein.
Figure 12:
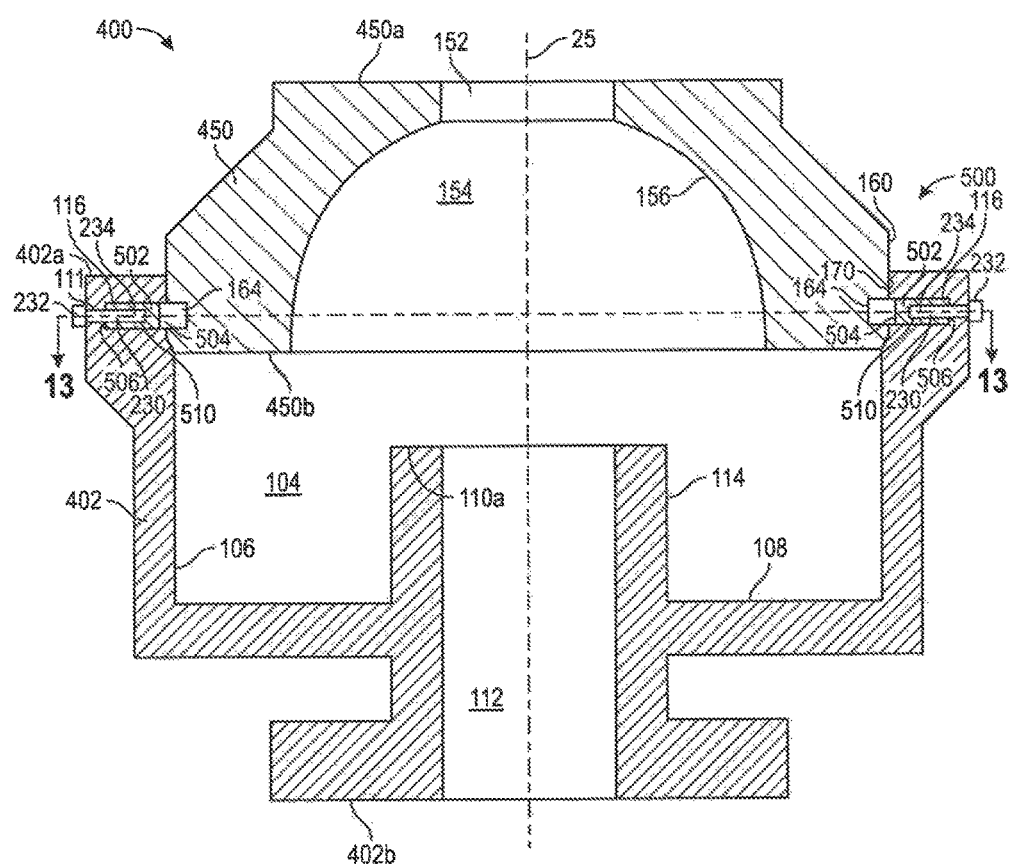
FIG. 12 is a side cross-sectional view of the annular BOP of FIG. 11 along line 12-12 of FIG. 11.
Figure 13:
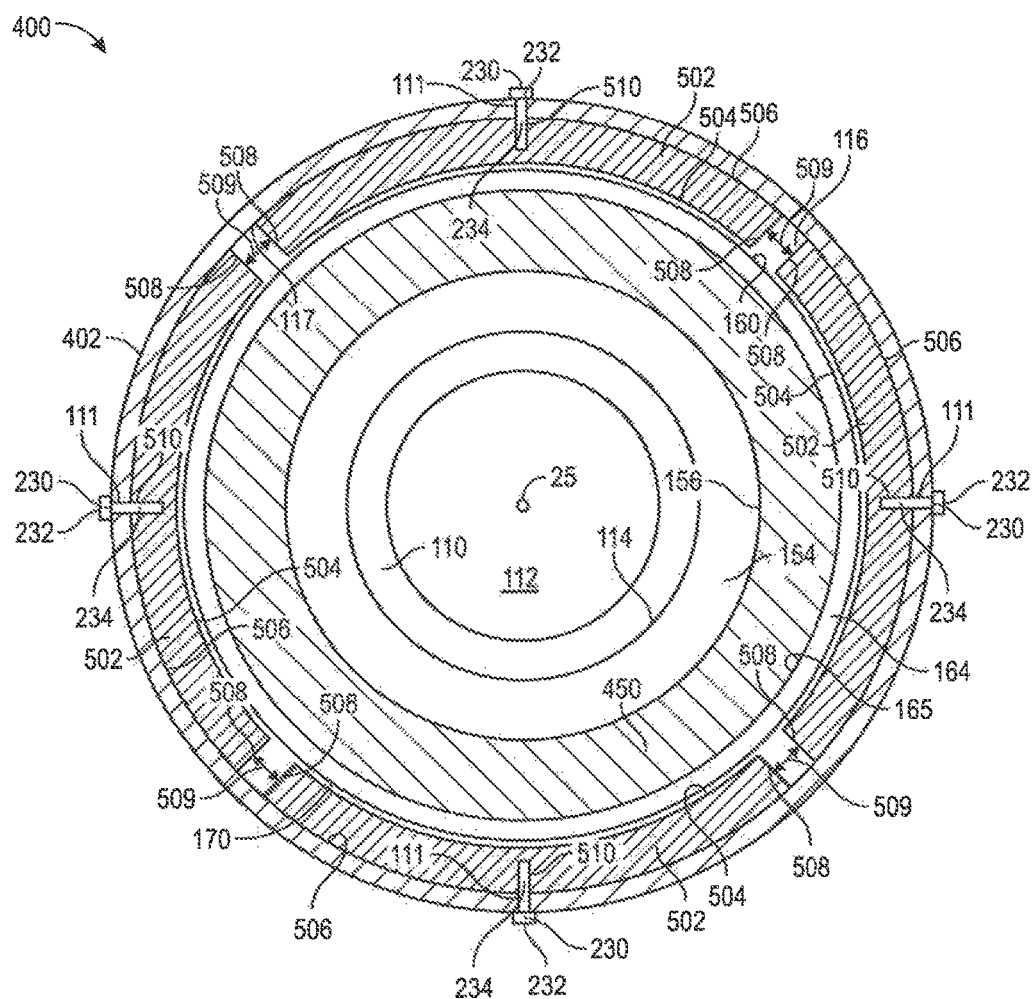
FIG. 13 is a top cross-sectional view of the annular BOP of FIG. 11 along line 13-13 of FIG. 12.

As shown particularly in FIG. 10, in response to an application of an axially directed upwards force 235, force 235 is applied to a lower surface 202L of each ring segment 202 via a lower annular surface 164L of the annular groove 164 of top 150. The axially upwards force 235 is then transmitted to housing 102 via engagement between the upper surface 202U of each ring segment 202 and an upper surface 116U of the annular groove 116 of housing 102. If the direction of force 235 were reversed, the downwardly directed axial force 245 would be applied to upper surface 202U of each segment 202 via an upper annular surface 164U of annular groove 164 and transferred to housing 102 via engagement between the lower surfaces 202L of segments 202 and a lower annular surface 116L of annular groove 116.

Given that in this embodiment of connection assembly 200 ring segments 202 have a width 202W greater than a height 202H of segments 202, the surface area of each engagement surface 164L, 202L, 202U, and 116U, responsible for transferring the force 235 to housing 102, is maximized in a space-efficient manner, such as by minimizing the thickness of the flange 158 of top 150. Moreover, the reduced height 202H of segments 202 thereby increases the axial thickness of an annular lip 119 of housing 102 extending between upper surface 116U of annular groove 116 and the upper end 102a of housing 102. The increased thickness of lip 119 resists bending or buckling of lip 119 in response to the application of force 235, permitting annular groove 116 to extend 360° about the longitudinal axis of housing 102. In other words, if the height 202H of segments 202 were increased relative width 202W, thereby reducing the thickness of lip 119, the presence of 360° annular groove 116 may result in buckling of lip 119 in response to the application of force 235, depending upon the magnitude of force 235.

The efficient maximization of the area of surfaces 164L, 202L, 202U, and 116U reduces or minimizes the stress applied to flange 158 of top 150 and the upper end 102a of housing 102, allowing top 150 to be subjected to greater forces 235 while maintaining the structural integrity of annular BOP 100. Moreover, because ring segments 202 extend along a majority of the circumferential length of interface 170 between flange 158 of top 150 and housing 102, upward force 235 is efficiently distributed along the majority of the circumferential length of interface 170 as force 235 is transferred from top 150 and housing 102. In this arrangement, stress is efficiently distributed both radially by maximizing the area of engagement surfaces 164L, 202L, 202U, and 116U, and circumferentially by ring segments 202 that extend along most of the circumferential length of interface 170.

Referring to FIGS. 11-15, another embodiment of an annular BOP 400 is shown for use with offshore well system 10 of FIG. 1. BOP 400 is shown schematically in FIGS. 11-15, and thus, BOP 400 may include features not shown in FIGS. 11-15. Particularly, the actuation assembly of BOP 400 is not shown in FIGS. 11-15. BOP 400 also includes features in common with BOP 100 described above, and shared features are labeled similarly. In the embodiment shown, BOP 100 generally includes an outer housing 402 having a first or upper end 402a and a second or lower end 402b, an upper housing or top 450 having a first or upper end 450a and a second or lower end 450b, and a releasable connection assembly 500 generally including a plurality of circumferentially positioned arcuate ring segments 502, and a plurality of the positioners 230. In this embodiment, ring segments 502 are configured similarly to ring segments 202 and include a radially inner surface 504, a radially outer surface 506, a pair of lateral side surfaces 508. However, unlike ring segments 202, segments 502 only include an aperture 510 extending at least partially into outer surface 506.

Aperture 510 of each ring segment 502 includes threads disposed on an inner surface thereof for threadably connecting with the threaded shank 234 of the corresponding positioner 230 for actuating the connection assembly 500 between unlocked and locked positions. Particularly, unlike connection assembly 200 described above, releasable connection assembly 500 of annular BOP 400 includes an unlocked position with arcuate ring segments 502 disposed in a radially outwards (shown in FIG. 13) position allowing for relative axial movement between housing 402 and top 450, and a locked position with ring segments 502 disposed in a radially inwards position (shown in FIG. 15) restricting relative axial movement between housing 402 and top 450 such that top 450 is axially locked to housing 402. Specifically, in the unlocked position of connection assembly 500, the outer surface 506 of each arcuate ring segment 502 is disposed directly adjacent or physically engages the inner surface 117 of the annular groove 116 of housing 402 while the inner surface 504 is radially spaced or disposed distal the inner surface 165 of the annular groove 164 of top 450. In this position, the inner surface 504 of each arcuate ring segment 502 is aligned with or disposed radially outwards from interface 170 between housing 402 and top 450 such that top 450 is allowed to move axially relative housing 402. In addition, in this position an arcuate or circumferential gap 509 extends between each arcuate ring segment 502.

Figure 14:
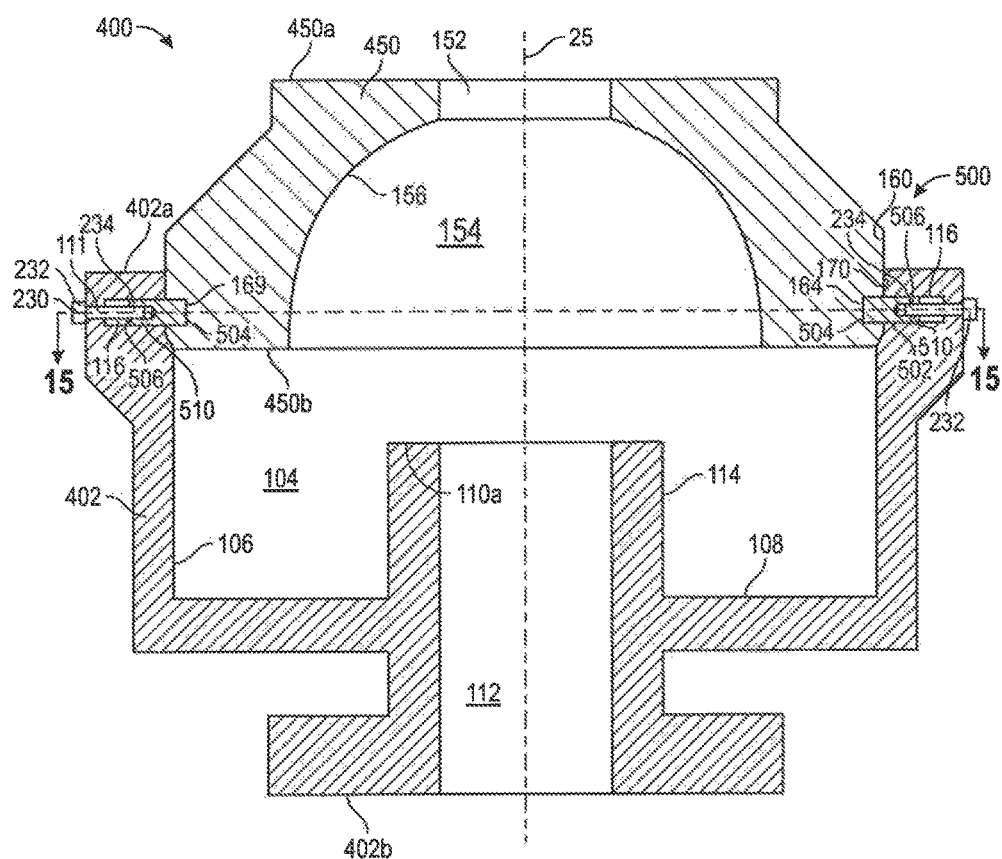
FIG. 14 is another side cross-sectional view of the annular BOP of FIG. 11 along line 12-12 of FIG. 11.
Figure 15:
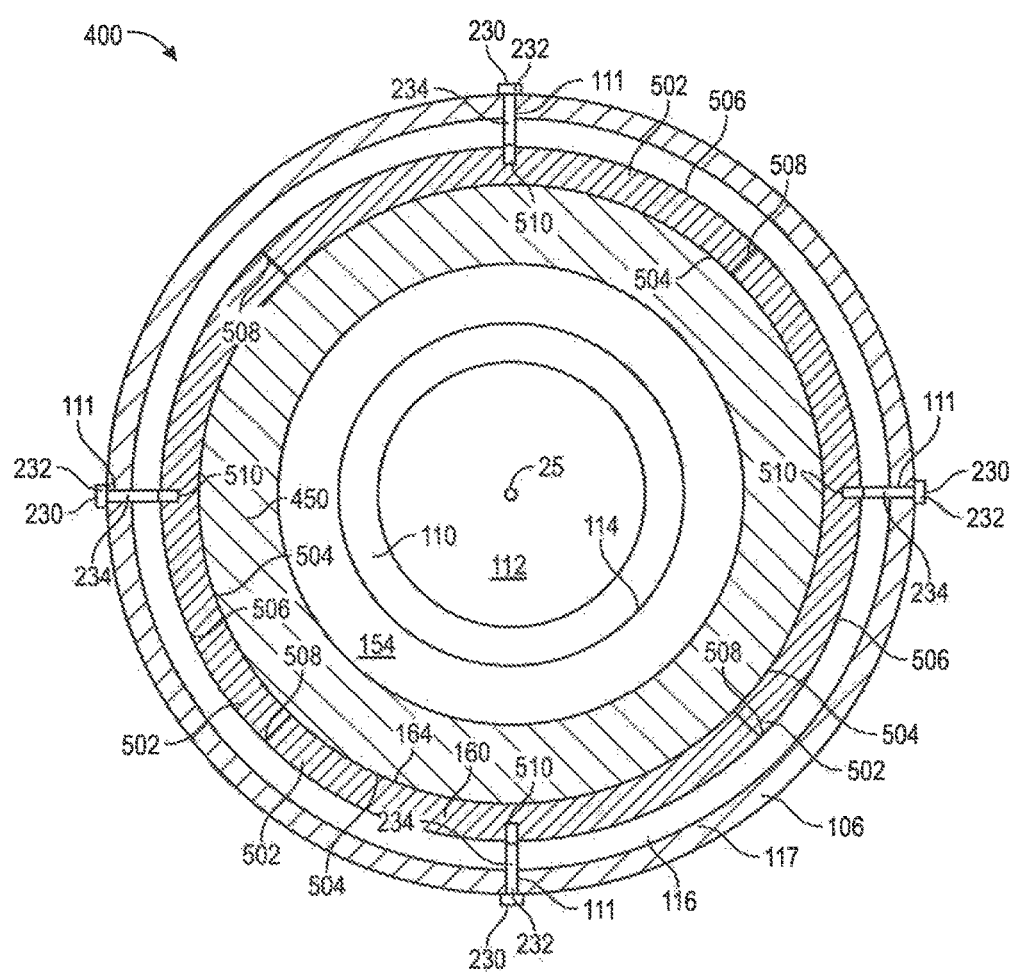
FIG. 15 is a top cross-sectional view of the annular BOP of FIG. 11 along line 15-15 of FIG. 14.

As shown particularly in FIGS. 14 and 15, in the locked position of connection assembly 500 and ring segments 502 the arcuate ring segments 502 are disposed in the radially inner position where the inner surface 504 of each segment 502 is disposed directly adjacent or physically engages the inner surface 165 of the annular groove 164 of top 450 while the outer surface 506 of each segment 502 is radially spaced from or disposed distal the inner surface 117 of the annular groove 116 of housing 402. In this arrangement, each arcuate ring segment 502 extends radially across the circumferential interface 170, thereby restricting relative axial movement between housing 402 and top 450. Unlike housing 102 and top 150 of the annular BOP 100 described above, the annular groove 116 of housing 402 has a greater radial width than the radial width of the annular groove 164 of top 450, thereby placing connection assembly 500 in the locked position when arcuate ring segments 502 are disposed in the radially inwards position. In addition, when connection assembly 500 is disposed in the locked position, the arcuate gap 509 between adjacent ring segments 502 is reduced or eliminated. Thus, when connection assembly 500 is disposed in the locked position, ring segments 502 extend along the entirety, or at least the substantial entirety, of the circumferential length of interface 170 between housing 402 and top 450. In this manner, stress risers are mitigated as forces transmitted between housing 402 and top 450 are distributed across the vast majority or substantial entirety of the circumference of interface 170. Arcuate ring segments 502 may be actuated or displaced between the radially outwards and radially inwards position by rotating positioners 230, which are threadably connected with a corresponding ring segment 502.

The above discussion is meant to be illustrative of the principles and various embodiments of the present disclosure. While certain embodiments have been shown and described, modifications thereof can be made by one skilled in the art without departing from the spirit and teachings of the disclosure. The embodiments described herein are exemplary only, and are not limiting. Accordingly, the scope of protection is not limited by the description set out above, but is only limited by the claims which follow, that scope including all equivalents of the subject matter of the claims.

What is claimed is:

1. A blowout preventer, comprising:
a top comprising a chamber and an annular groove extending into a surface of the top, the chamber of the top configured to receive at least a portion of a packer;
a housing comprising a chamber and an annular groove extending into a surface of the housing, the chamber of the housing configured to receive at least portion of an actuation assembly configured to actuate the packer to seal a bore of the blowout preventer; and
a connection assembly configured to releasably couple the top to the housing, the connection assembly comprising:
a plurality of arcuate ring segments, each arcuate ring segment having a radial width that is greater in size than an axial height of the ring segment; and
a plurality of positioners, each positioner configured to radially displace the ring segment between a locked position restricting relative axial movement between the top and the housing, and an unlocked position allowing for relative axial movement between the top and the housing;
wherein, when the arcuate ring segment is disposed in the locked position, the arcuate ring segment is disposed in the annular groove of the top and the annular groove of the housing; and
wherein each of the plurality of arcuate ring segments comprises a pair of lateral end surfaces; and when the plurality of arcuate ring segments are disposed in the locked position, the lateral end surfaces of each arcuate ring segment engages a lateral end surface of an adjacently positioned arcuate ring segment.

2. The blowout preventer of claim 1, wherein:
the annular groove of the housing extends 360° about a longitudinal axis of the housing; and
the annular groove of the top extends 360° about a longitudinal axis of the top.

3. The blowout preventer of claim 1, wherein, when the ring segment is disposed in the unlocked position, the ring segment is disposed entirely within the annular groove of the top.

4. The blowout preventer of claim 1, wherein the positioner comprises a threaded fastener disposed in a radially extending aperture of the arcuate ring segment.

5. The blowout preventer of claim 4, wherein:
the threaded fastener threadably engages an inner surface of an aperture extending radially into the top; and
in response to rotation of the threaded fastener, the arcuate ring segment is actuated between the locked and unlocked positions.

6. The blowout preventer of claim 1, further comprising: an alignment member
extending into the annular groove of the top;
wherein the alignment member extends into an alignment groove of the ring segment to restrict relative rotation between the ring segment and the housing.

7. The blowout preventer of claim 1, wherein
the plurality of positioners are configured to radially displace the ring segments between the locked position and the unlocked position; and
wherein, when the plurality of arcuate ring segments are disposed in the locked position, the plurality of arcuate ring segments cover a majority of a circumferential length of an annular interface disposed radially between the top and the housing.

8. A blowout preventer, comprising:
a top comprising a chamber and an annular groove extending into a surface of the top, the chamber of the top configured to receive at least a portion of a packer;
a housing comprising a chamber and an annular groove extending into a surface of the housing, the chamber of the housing configured to receive at least portion of an actuation assembly configured to actuate the packer to seal a bore of the blowout preventer; and
a connection assembly configured to releasably couple the top to the housing, the connection assembly comprising:
a plurality of arcuate ring segments, each of the plurality of arcuate ring segments comprising a pair of lateral end surfaces; and
a plurality of positioners configured to radially displace the ring segments between a locked position restricting relative axial movement between the top and the housing, and an unlocked position allowing for relative axial movement between the top and the housing;
wherein, when the plurality of arcuate ring segments are disposed in the locked position, the plurality of arcuate ring segments cover a majority of a circumferential length of an annular interface disposed radially between the top and the housing and the lateral end surfaces of each arcuate ring segment engages a lateral end surface of an adjacently positioned arcuate ring segment; and
wherein, when the plurality of arcuate ring segments are disposed in the locked position, the plurality of arcuate ring segments are disposed in the annular groove of the top and the annular groove of the housing.

9. The blowout preventer of claim 8, wherein, when the plurality of arcuate ring segments are disposed in the locked position, the plurality of arcuate ring segments cover the substantial entirety of the circumferential length of the annular interface disposed radially between the top and the housing.

10. The blowout preventer of claim 8, wherein:
each of the plurality of arcuate ring segments comprises an annular upper surface and an annular lower surface; and
when the plurality of arcuate ring segments are disposed in the locked position, in response to a first axially directed force applied against the top, the annular lower surface of each of the plurality of ring segment engages an annular lower surface of the annular groove of the top to restrict relative axial movement between the top and the housing.

11. The blowout preventer of claim 10, wherein, when the plurality of arcuate ring segments are disposed in the locked position, in response to the first axially directed force applied against the top, the annular upper surface of each of the plurality of ring segment engages an annular upper surface of the annular groove of the housing to restrict relative axial movement between the top and the housing.

12. The blowout preventer of claim 11, wherein, when the plurality of arcuate ring segments are disposed in the locked position, in response to the first axially directed force applied against the top, the first force is circumferentially distributed along a majority of a circumferential length of the upper surface of the annular groove of the housing.

13. The blowout preventer of claim 8, wherein each of the plurality of arcuate ring segments comprises a radial width that is greater in size than an axial height of the ring segment.

14. A blowout preventer, comprising:
- a top comprising a chamber and an annular groove extending into a surface of the top, the chamber of the top configured to receive at least a portion of a packer;
- a housing comprising a chamber and an annular groove extending into a surface of the housing, the chamber of the housing configured to receive at least portion of an actuation assembly configured to actuate the packer to seal a bore of the blowout preventer; and
- a connection assembly configured to releasably couple the top to the housing, the connection assembly comprising:
  - a plurality of arcuate ring segments, each arcuate ring segment comprising an annular upper surface and an annular lower surface; and
  - a plurality of positioners, each positioner configured to radially displace the plurality of arcuate ring segments between a locked position restricting relative axial movement between the top and the housing, and an unlocked position allowing for relative axial movement between the top and the housing;
- wherein, when the plurality of arcuate ring segments is disposed in the locked position, the plurality of arcuate ring segments is disposed in the annular groove of the top and the annular groove of the housing;
- wherein, when the plurality of arcuate ring segments is disposed in the locked position, in response to a first axially directed force applied against the top, the annular lower surface of each ring segment engages an annular lower surface of the annular groove of the top to restrict relative axial movement between the top and the housing and the plurality of arcuate ring segments interlock into engagement with each other.

15. The blowout preventer of claim 14, wherein, when the plurality of arcuate ring segments is disposed in the locked position, in response to the first axially directed force applied against the top, the annular upper surface of the ring segment engages an annular upper surface of the annular groove of the housing to restrict relative axial movement between the top and the housing.

16. The blowout preventer of claim 14, wherein, when the plurality of arcuate ring segments is disposed in the locked position, in response to a second axially directed force applied against the top, the annular upper surface of each ring segment engages an annular upper surface of the annular groove of the top.

17. The blowout preventer of claim 16, wherein, when the plurality of arcuate ring segments is disposed in the locked position, in response to the second axially directed force applied against the top, the annular lower surface of each ring segment engages an annular lower surface of the annular groove of the housing.

18. The blowout preventer of claim 14, wherein each arcuate ring segment comprises a radial width that is greater in size than an axial height of the ring segment.

19. The blowout preventer of claim 14, wherein the
- plurality of positioners is configured to radially displace the plurality of ring segments between the locked position and the unlocked position;
- wherein, when the plurality of arcuate ring segments are disposed in the locked position, the plurality of arcuate ring segments cover a majority of a circumferential length of an annular interface disposed radially between the top and the housing.

* * * * *